United States Patent Office 3,464,814
Patented Sept. 2, 1969

3,464,814
LEACHING ZINC PLANT PURIFICATION
RESIDUE
Meryl A. Jackson and James L. Owings, Great Falls, Mont., assignors to The Anaconda Company, New York, N.Y., a corporation of Montana
No Drawing. Filed Feb. 24, 1966, Ser. No. 529,659
Int. Cl. C22b 19/22
U.S. Cl. 75—101                7 Claims

ABSTRACT OF THE DISCLOSURE

Metal values from a purification residue produced during the processing of zinc ores for prospective electrolytic recovery of zinc metal are recovered by leaching the zinc purification residue with a dilute solution of sulfuric acid while simultaneously bubbling air through the suspension of the residue in the acid solution.

This invention relates to improvements in a process for the recovery of metal values from a purification residue which is produced during the processing of zinc ores for prospective electrolytic recovery of zinc metal.

In the electrolytic method for winning zinc from its ore, a zinc-enriched ore is first roasted and then leached, usually with sulfuric acid. The leach liquor is separated from the insolubilized material and neutralized. This liquor is rich in zinc values, and also contains traces of other metals such as copper, cadmium, nickel, indium, cobalt, and germanium. Removal of these metals from the leach liquor is not only regarded as desirable because of the commercial value of the metals; it is also essential because they interfere with the efficiency of the electrolytic process for recovering zinc. This is particularly true of cobalt and germanium the presence of which renders electrolytic recovery of zinc uneconomical or even impossible.

Trace metals are removed by the addition of metallic zinc dust to the neutral leach liquor, and the resulting residue, usually called a zinc plant purification residue, is subsequently separated from the zinc-enriched liquor. The liquor is forwarded to the electrolytic plant for zinc recovery. The purification residue is usually processed for recovery of metal values. Heretofore, such recovery has been effected by collecting and stockpiling the residue, and exposing it to the atmosphere to induce oxidation of the metallic components. After the residue has been in stockpile for periods of up to six months, the residue is then acid leached in order to remove the metal values from an otherwise insoluble residue. Immediate acid leaching of the purification residue, that is, leaching without stockpiling and oxidation, results in low recoveries of the metal values. Low recoveries have also been found to ensue when the purification residue is immediately leached in the presence of oxidation agents. Although leaching subsequent to stockpiling achieves a high recovery, it is regarded as economically disadvantageous to freeze the capital represented by the stockpile for the required periods of time.

The process of this invention effects improvements in the recovery of metal values from zinc plant purification residue. Stockpiling is no longer required; rather, the residue may be treated immediately after its precipitation from the neutral leach liquor by the addition of zinc dust. The method of the invention also achieves high recoveries of the metal values, and does so at a minimum expense.

The process of this invention entails leaching the precipitation residue with sulfuric acid, and during leaching, bubbling air through the suspension of the residue in the acid until substantially complete extraction or solubilization of metal values has been effected.

The purification residue from the zinc electrolytic plant is collected until a sufficient quantity is gathered for leaching purposes. This batch of residue is then placed in a leaching tank and acid is added. Usually dilute sulfuric acid, 5% to 30% by weight, is used for this purpose. Air is then bubbled through the suspension of residue and acid at a fairly vigorous rate. Leaching proceeds, aided by the oxidation caused by the air bubbling through the suspension, until the metal values have become solubilized. The process may be monitored and controlled by the use of instruments for measuring oxidation potential, by electrolytic pH measurements or by similar means.

Alternatively, a batch of the precipitation residue may be leached with a quantity of dilute sulfuric acid which is less than sufficient effectively to leach a given quantity of residue. Additional acid is then added during the leaching, i.e., during the period within which air is bubbled through the leach liquor. As before, the end point of the leaching procedure is established by recording the change in the oxidation potential of the suspension. It is understood that the end point may also be determined by other analytical procedures as familiar to those skilled in the art.

The amount of air that must be used for a given quantity of leach liquor in the process of this invention depends on a number of variables, such as the composition of the zinc purification residue and the process temperature. In general, a large amount of air is required when the zinc purification residue contains a high percentage of copper. At higher process temperatures, the amount of air may be proportionally reduced. It is understood that other oxygen containing gas may be used in place of the air. The amount of oxygen in such gas may range from 100% to below the oxygen concentration in the air. Usually, air is the most economical for the process. The rate of air fed in the leach liquor must be sufficient to reduce the holdup time in the leach tank to a minimum. Conventional air agitation alone, however, is inadequate for the dissolution of all desired metal values.

The composition of the zinc plant residue varies within a wide range depending on the ore and the purification process of the zinc plant. A typical composition may contain 10%–12% cadmium, 6%–8% copper, and 30%–35% zinc. The remainder also contains trace amounts of other metals stated previously. In accordance with this invention, the filter cake, while wet, is charged into a tank containing diluted sulfuric acid, which may be zinc plant spent electrolyte containing a small amount of zinc residue or it may be a freshly prepared sulfuric acid solution by mixing, for example, 60° Bé. with a sufficient amount of water to provide 70–150 g. sulfuric acid per liter.

The leaching is effected by the simultaneous introduction of air into the leach tank. Air may be introduced into the leach tank in any conventional manner provided that a sufficient amount and a suitable rate is used. Preferably, air is introduced in the tank in a manner that will provide sufficient agitation of the leach liquor to maintain a uniform slurry. For example, air may be introduced in the leach liquor with arc shaped air spargers concentrically positioned in the lower portion which occupy two quadrants of the tank. Compressed air is introduced in the tank to effect oxidation and simultaneous mixing. Generally, more than 4.5 cu. ft. of air/(sq. ft. of tank cross section) (min.) are required to effect adequate mixing and oxidation in a tank of average height (4–10 ft.). A rate as high as 9 cu. ft. of air/(sq. ft. of tank cross section) (min.) or more may be required in some instances where the copper content is unusually high.

The leaching time varies according to the process variables and can be best determined in an individual case as indicated by the oxidation potential. Usually, 3 to 4 hours are all that is necessary. An oxidation-leaching period can be extended to beyond 6 hours in specific instances when the leaching condition is not favorable. After leaching is completed, as indicated by the oxidation potential or other analytical means, the leaching liquor containing the dissolved metallic values is then clarified to remove the insolubles and the clear filtrate is further treated for the recovery of metal values in a conventional manner. Usually, copper and cadmium, the two predominant components in the filtrate, are recovered by accurate zinc dust addition.

We claim:

1. In a process for the treatment of acid-soluble zinciferous material containing copper and cadmium as impurities which involves leaching such material with sulfuric acid to form a zinc sulfate solution containing dissolved copper and cadmium, neutralizing said solution, precipitating the copper and cadmium from said solution by treatment thereof with an excess of metallic zinc dust, and separating the resulting precipitate containing copper, cadmium and zinc in elemental form, the improvement which comprises leaching said precipitate, without prior oxidation, with a dilute solution of sulfuric acid at atmospheric temperature and pressure while simultaneously bubbling air through the suspension of said precipitate in said acid solution until substantially complete dissolution of the copper and cadmium has been effected, and thereafter recovering the copper and cadmium from the leach solution.

2. In a process according to claim 1 wherein the air is introduced in the leach liquor contained in a tank at a rate above about 4.5 cu. ft. per sq. ft. of tank cross section per minute.

3. In a process according to claim 2 wherein the sulfuric acid solution is a spent zinc electrolyte containing a minor amount of zinc residue.

4. In a process according to claim 2 wherein the sulfuric acid solution contains 70–150 gms. $H_2SO_4$ per liter.

5. In a process according to claim 2 wherein the end point of the process is determined by the oxidation potential corresponding to a predetermined value.

6. In a process according to claim 2 wherein the air provides the agitation.

7. The method of claim 2 wherein the metal values comprise cadmium, copper, and zinc.

References Cited

UNITED STATES PATENTS

| | | | |
|---|---|---|---|
| 1,919,947 | 7/1933 | Johnston | 75—117 |
| 1,949,927 | 3/1934 | Corson | 75—117 |
| 2,746,859 | 5/1956 | McGauley et al. | 75—115 |

FOREIGN PATENTS

| | | |
|---|---|---|
| 138,947 | 2/1920 | Great Britain. |

L. DEWAYNE RUTLEDGE, Primary Examiner

T. R. FRYE, Assistant Examiner

U.S. Cl. X.R.

75—109, 120, 117, 115; 204—119